United States Patent [19]
Okamura

[11] Patent Number: 6,075,378
[45] Date of Patent: Jun. 13, 2000

[54] ELECTRICAL ENERGY STORAGE CAPACITOR POWER SUPPLY CAPABLE OF SHORTING OUT DEFECTIVE CAPACITORS

[75] Inventor: Michio Okamura, Kanagawa, Japan

[73] Assignee: JEOL Ltd., Tokyo, Japan

[21] Appl. No.: 09/103,906

[22] Filed: Jun. 24, 1998

[30] Foreign Application Priority Data

Jun. 24, 1997 [JP] Japan ..................................... 9-166910

[51] Int. Cl.[7] ......................... G01R 31/36; H01M 10/48; H02H 7/16
[52] U.S. Cl. ......................... 324/771; 324/433; 324/434; 324/548; 320/122; 320/166; 361/16; 361/67
[58] Field of Search ................................... 324/426, 433, 324/434, 522, 771, 548; 320/120, 122, 166, 167; 361/16, 60, 67, 70

[56] References Cited

U.S. PATENT DOCUMENTS

| | | | |
|---|---|---|---|
| 4,879,188 | 11/1989 | Meinhold | 429/7 |
| 4,881,026 | 11/1989 | Ishida | 324/434 |
| 4,931,738 | 6/1990 | MacIntyre | 324/434 |
| 5,170,124 | 12/1992 | Blair | 324/434 |
| 5,532,572 | 7/1996 | Okamura | 320/166 |
| 5,683,827 | 11/1997 | Yu | 429/1 |
| 5,726,552 | 3/1998 | Okamura | 320/122 |
| 5,764,063 | 6/1998 | Katou | 324/434 |
| 5,783,928 | 7/1998 | Okamura | 320/122 |
| 5,808,469 | 8/1998 | Kopera | 324/434 |
| 5,825,155 | 10/1998 | Ito | 324/434 |
| 5,894,212 | 4/1999 | Balogh | 324/434 |
| 5,977,748 | 11/1999 | Okamura | 320/166 |

OTHER PUBLICATIONS

"A Basic Study on Power Storage Capacitor Systems", Michio Okamura, *Denki Gakkai Ronbunshi*, vol. 115–B, No. 5, May 1995, pp. 504–510.

*Primary Examiner*—Glenn W. Brown
*Attorney, Agent, or Firm*—Webb Ziesenheim Logsdon Orkin & Hanson, P.C.

[57] ABSTRACT

There is disclosed a power supply for storing electrical energy in capacitors connected in series, the power supply having a function of shorting out capacitors at fault. Shorting means are connected in parallel with the capacitors, respectively. If any one of the capacitors is charged abnormally, it is detected by detection means. The terminals of this detected capacitor are shorted out by the corresponding one of the shorting means. The shorting means can also act as bypass means ancillary to parallel monitors, respectively. By detecting temperature rises of the bypass means, abnormal charging of the capacitors can be judged.

11 Claims, 3 Drawing Sheets

ELECTRICAL ENERGY STORAGE CAPACITOR POWER SUPPLY CAPABLE OF SHORTING OUT DEFECTIVE CAPACITORS

FIELD OF THE INVENTION

The present invention relates to a power supply for storing electrical energy in capacitors connected in series and, more particularly, to an electrical energy storage capacitor power supply having a function of shorting out capacitors at fault.

BACKGROUND OF THE INVENTION

An energy capacitor system (ECS) is an electrical power storage system consisting of capacitors, parallel monitors and a current pump, and has been already introduced in literature (e.g., "A Basic Study on Power Storage Capacitor Systems", *Denki Gakkai Ronbunshi*, Vol. 115-B, No. 5, May 1995, pp. 504–510). In the ECS, electrical energy is stored in the plural capacitors connected in series. A charging control circuit known as a parallel monitor is connected across the terminals of each capacitor. During charging, the parallel monitor bypasses the charging current around the capacitor when the terminal voltage has reached a preset voltage, and thus prevents further charging of the capacitor.

As a result, all the capacitors connected in series are uniformly charged up to the preset voltage. In consequence, it is possible to derive almost the full storage capacity of the capacitor assemblage.

Today, manufacture of a large-sized energy capacitor system using thousands of electrical double layer capacitors is being discussed. Whenever a few capacitors of such a large-sized energy capacitor system are at fault, if the operation is stopped and the defective capacitors are replaced, the efficiency of the operation will not be high. If the operation is continued without replacing the defective capacitors, and if the whole system is serviced at regular intervals of time, then the efficiency of the operation of the system will be enhanced. This will save the cost of servicing the system.

It is an object of the present invention to provide a power supply that acts to store electrical energy in capacitors and has a function of shorting out defective capacitors.

SUMMARY OF THE INVENTION

Briefly, in accordance with the teachings of the invention, a power supply for storing electrical energy in capacitors connected in series comprises shorting means connected in parallel with the capacitors, respectively, and detection means. If any one of the capacitors is charged abnormally, the corresponding detection means detects the abnormal charging. If any one of the capacitors is judged to be charged abnormally by the corresponding detection means, the corresponding shorting means shorts out the terminals of these capacitors.

BRIEF DESCRIPTION OF THE DRAWINGS

Other objects and advantages will become apparent from the following detailed description made with reference to the drawings in which.

DESCRIPTION OF THE PREFERRED EMBODIMENTS

Figure 1:
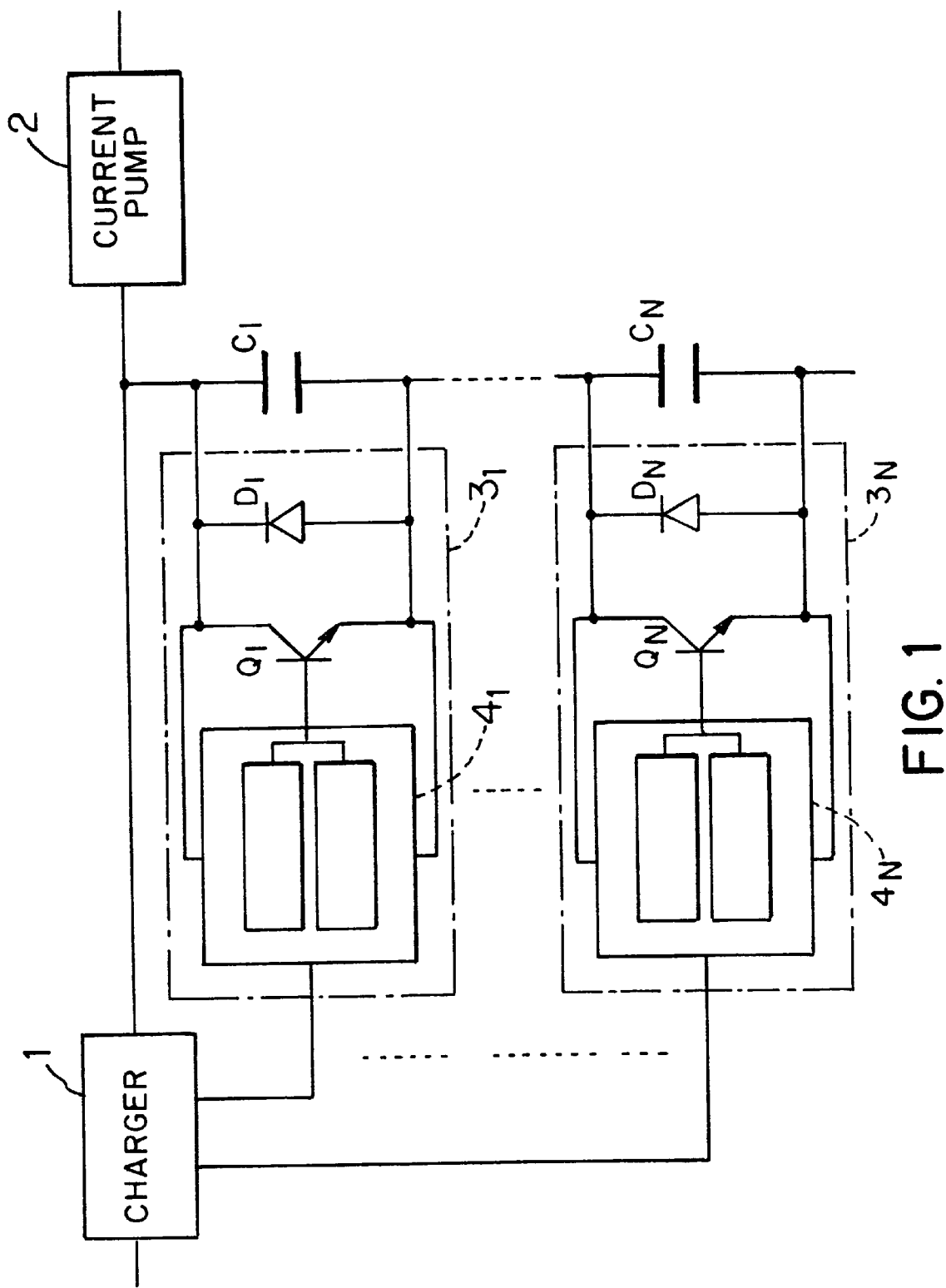
FIG. 1 is a circuit diagram of a power supply acting to store electrical energy in capacitors and having a function of shorting out defective capacitors, the power supply being built in accordance with the present invention.

Referring to FIG. 1, there is shown a power supply for storing electrical energy in capacitors, the power supply having a function of shorting out defective capacitors in accordance with the present invention. The capacitors, $C_1$–$C_N$, are connected in series to form a capacitor bank. These capacitors are charged by a charger 1. The electric power stored in the capacitor bank is supplied in the form of appropriate current and voltage to a load via a current pump 2.

Parallel monitors $3_1$–$3_N$ are connected with the capacitors $C_1$–$C_N$, respectively. The parallel monitors $3_1$–$3_N$ comprise diodes $D_1$–$D_N$ connected with the capacitors $C_1$–$C_N$, respectively, with a reverse polarity to the charging current, semiconductor switching devices (power transistors) $Q_1$–$Q_N$, respectively, connected with the capacitors $C_1$–$C_N$, respectively, so as to bypass the charging current, and monitor control circuits $4_1$–$4_N$ respectively, for controlling the transistors $Q_1$–$Q_N$, respectively.

Each of the monitor control circuits $4_1$–$4_N$ serves to control the charging and abnormality. With respect to the charging control function, the monitor control circuits $4_1$–$4_N$ monitor the terminal voltages of the capacitors, respectively. When the terminal voltage of any one of the capacitors reaches a preset value, the corresponding control circuit turns on the corresponding one of the transistors $Q_1$–$Q_N$ to bypass the charging current. Consequently, this capacitor is stopped from being charged, and the terminal voltage is maintained at the preset value. The other capacitors are kept charged. This function is known and intrinsic to the parallel monitors.

With respect to the abnormality control function, if any one of the capacitors is at fault and charged abnormally, the corresponding one of the monitor control circuits $4_1$–$4_N$ turns on the corresponding one of the transistors $Q_1$–$Q_N$, thus shorting out the defective capacitor.

A first preferred method of judging whether the charging is abnormal due to failure in any one of the capacitors $C_1$–$C_N$ is to use detection of abnormal increase in temperature due to heat generation from the corresponding one of the transistors $Q_1$–$Q_N$.

A second preferred method is to monitor the terminal voltages for sensing whether any one of the terminal voltages is abnormally higher from the start of the charging.

A third method is to detect the time between the instant of the start of the charging and the instant when a given terminal voltage is reached for judging whether the time duration is abnormal.

These methods have been devised, taking account of phenomena occurring during charging, i.e., any capacitor is at fault and thus opened, whereby its capacitance is reduced dramatically. In particular, if the capacitance decreases down to an extremely low level, the terminal voltage rises at a higher rate than the terminal voltages of the other normal capacitors. As a result, the charging control function of the corresponding parallel monitor turns on the semiconductor control device in a short time from the start of charging. This conducting state is maintained for a long time until the other normal capacitors are charged fully. Prolonged bypassing of the charging current accumulates heat, making the semiconductor control device in charge of the defective capacitor hotter than in a normal state.

Accordingly, if an abnormal temperature rise of the semiconductor control device is detected by the first method described above, then an abnormally charged state of the capacitor can be detected. For this purpose, temperature sensors for detecting the temperatures of the semiconductor control devices and means for comparing the detected temperatures with a reference temperature value are necessary.

If the capacitance of any one capacitor has decreased almost to the zero level due to failure, the terminal voltage will quickly reach the full charge voltage after the charging. Accordingly, if the terminal voltages are monitored from the start of the charging by the second method, and if any one of the terminal voltages is higher, then the corresponding capacitor can be judged to be charged abnormally. In order to implement the second method, means (i) receiving a charge start signal from the charger and detecting the terminal voltages of the capacitors and comparison means (ii) for comparing the detected terminal voltages with a threshold value are necessary.

If the capacitance of any one capacitor decreases, the terminal voltage rises at a higher rate than the terminals of the other normal capacitors. Therefore, if the third method described above is used to sense that the time elapsed until a given terminal voltage is reached from the start of charging is shorter than a threshold value, then the capacitor is judged to be at fault. To carry out the third method, time-measuring means and comparison means are necessary. The time-measuring means receives a charging start signal from the charger and counts time until the terminal voltages of the capacitors reach a preset value when the semiconductor switching devices $Q_1$–$Q_N$ are turned on. The comparison means compares the counted times with a threshold value.

Figure 2:
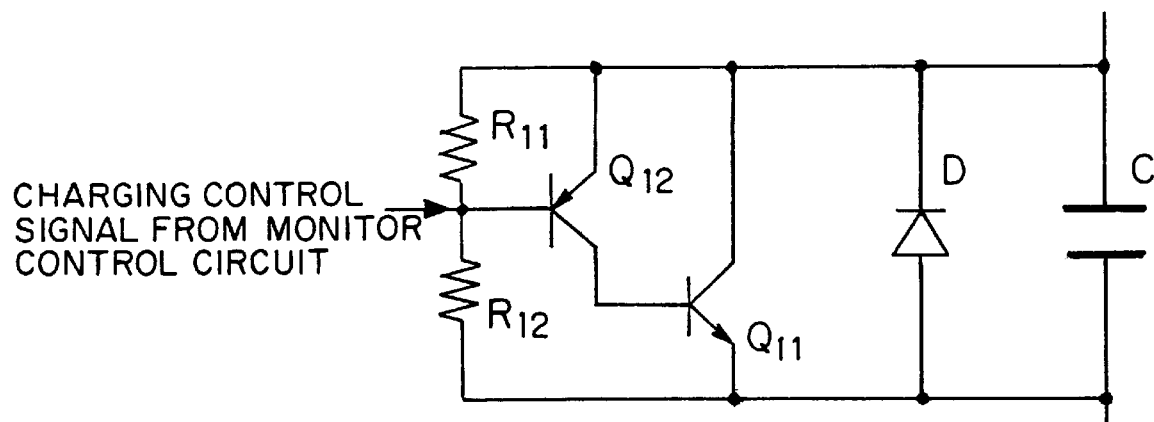
FIG. 2 is a diagram of a circuit for implementing an abnormality control function.
Figure 3:
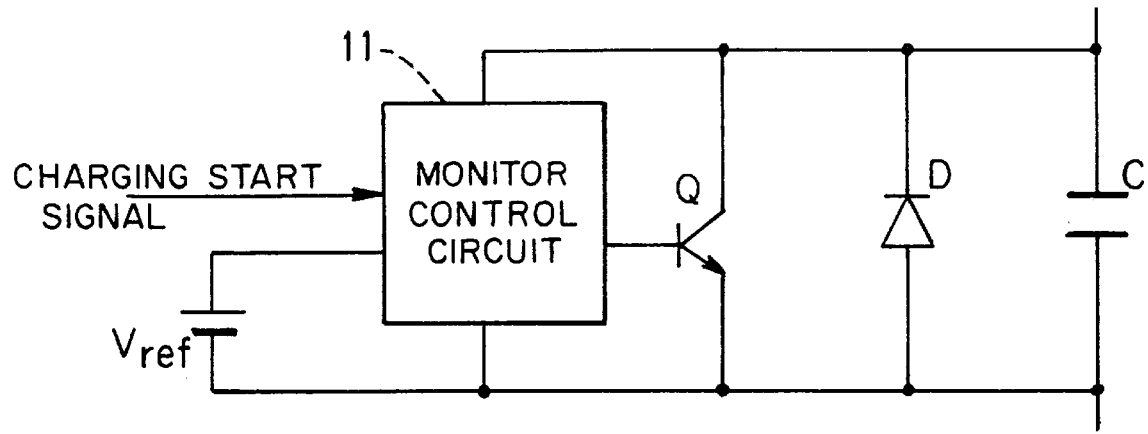
FIG. 3 is a diagram of another circuit for implementing an abnormality control function.

FIG. 2 shows an example of a circuit configuration for realizing an abnormality control function by the first method described above. FIG. 3 shows an example of another circuit configuration for realizing an abnormality control function by the third method described above.

In FIG. 2, a semiconductor switching device $Q_{11}$ is a power transistor connected across the terminals of a capacitor C and acts to bypass the charging current. A heat-sensitive resistor is used as either resistor $R_{11}$ or $R_{12}$. These resistors $R_{11}$ and $R_{12}$ are connected in series between the terminals of the capacitor C and thermally coupled to the semiconductor switching device $Q_{11}$. Where the resistor $R_{11}$ is a heat-sensitive resistor, a device having a positive temperature coefficient, i.e., the resistance increases if the temperature rises excessively, is used. Where the resistor $R_{12}$ is a heat-sensitive resistor, a device having a negative temperature coefficient, i.e., the resistance decreases if the temperature rises excessively, is employed. A semiconductor control device $Q_{12}$ is a control transistor having a control input connected to the junction of the resistors $R_{11}$ and $R_{12}$ connected in series. This control device $Q_{12}$ produces an output signal to control the conduction of the semiconductor switching device $Q_{11}$.

The operation of this circuit is as follows. During charging, if the capacitor C is charged to its preset full charge voltage, the semiconductor control device $Q_{12}$ is biased into conduction. Then, a bypass current begins to flow into the semiconductor switching device $Q_{11}$. Subsequently, excess current is bypassed while the voltage developed across the terminals of the capacitor C is maintained at the preset value. Every capacitor is charged close to the full charge voltage. However, if the temperature of the semiconductor switching device $Q_{11}$ rises excessively, the resistance of the resistor $R_{11}$ or $R_{12}$ that is a heat-sensitive resistor varies greatly, causing the semiconductor device $Q_{12}$ or $Q_{11}$ to conduct into a saturated state. This lowers the terminal voltage of the capacitor C to less than 1 V.

Figure 4A:
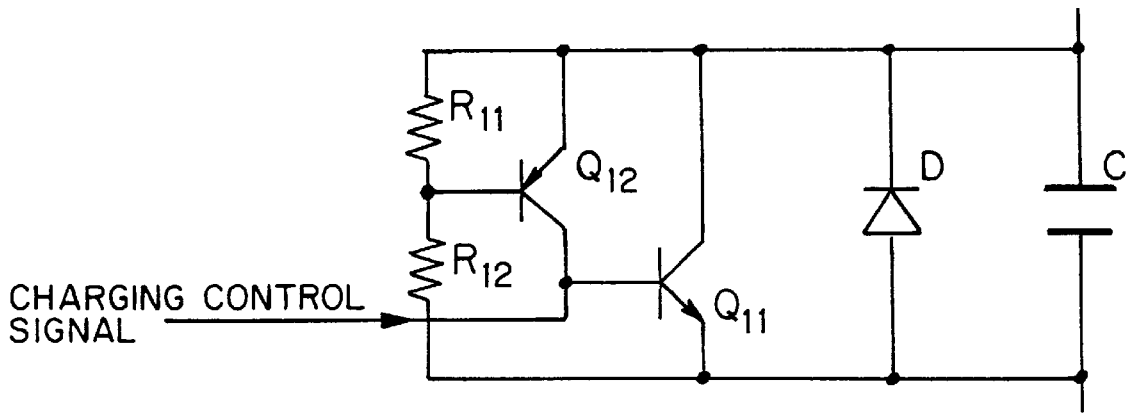
FIGS. 4(a) and 4(b) are diagrams of modifications of the circuit shown in FIG. 2.
Figure 4B:
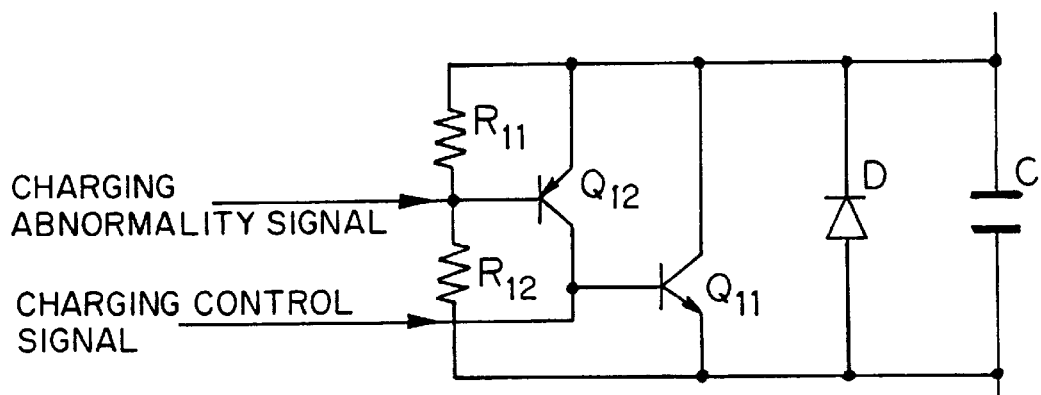

FIGS. 4(a) and 4(b) show modifications of the configuration of FIG. 2. In FIG. 4(a), either resistor $R_{11}$ or $R_{12}$ is a heat-sensitive resistor in the same way as in FIG. 2. A transistor $Q_{11}$ has a base to which a charging control signal is directly supplied to turn this transistor on and off. As the temperature of the transistor $Q_{11}$ rises, the transistor $Q_{12}$ turns on. If the capacitor is charged abnormally, this transistor $Q_{12}$ turns on the transistor $Q_{11}$.

In FIG. 4(b), resistors $R_1 1$ and $R_{12}$ are not heat-sensitive resistors but are normal fixed resistors. A charging abnormality-indicating signal from other charging abnormality detection means is supplied to the junction of the resistors $R_{11}$ and $R_{12}$ connected in series. A transistor $Q_{11}$ has a base to which a charging control signal is directly supplied to turn on the transistor $Q_{11}$. If the capacitor is charged abnormally, the transistor $Q_{11}$ is turned on by a transistor $Q_{21}$, which is turned on according to a charging abnormality signal from other charging abnormality detection means.

Figure 4C:
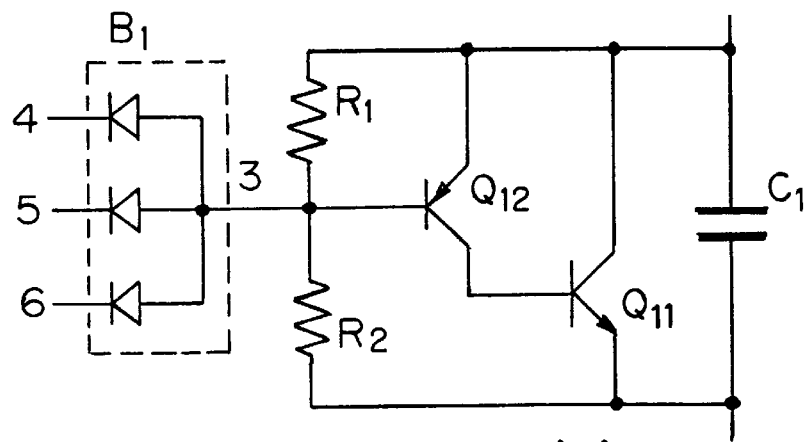
FIG. 4(c) is a diagram of a modification of the circuit configuration shown in FIG. 4(b)

FIG. 4(c) shows a modification of the configuration shown in FIG. 4(b). In FIG. 4(c), an OR logic $B_1$ having input terminals 4, 5, and 6 is connected to the junction of resistors $R_1$ and $R_2$ connected in series. The state of each charged capacitor is detected and charging abnormality-indicating signals are supplied to the input terminals 4, 5, and 6, respectively, by the three methods described above, for example. Any capacitor at fault can be shorted out by any abnormality-indicating signal. This can enhance the safety. Terminals 4, 5, and 6 provide a negative logic gate. When any one of the signals supplied to these terminals 4, 5, and 6 goes low, transistors $Q_{12}$ and $Q_{11}$ are turned on. In consequence, a capacitor $C_1$ is shorted out.

Referring to FIG. 3, a monitor control circuit 11 compares the voltage developed across a capacitor C with a preset voltage $V_{ref}$, and controls a semiconductor control device Q according to the terminal voltage of the capacitor C. In the circuit of FIG. 3, a signal indicating the start of charging is received as a charging signal from a charger. The time elapsing from the start of charging is measured. This circuit produces a signal to turn on the semiconductor control device Q provided that the terminal voltage of the capacitor C reaches the preset voltage $V_{ref}$ within a given time from the start of charging.

It is to be noted that the invention is not limited to the foregoing embodiments and that various changes and modifications are possible. For instance, in some of the embodiments described above, the temperatures of the bypassing transistors for the parallel monitors are detected, and the transistors are automatically kept in conduction. In another embodiment, the voltage developed across the terminals of each capacitor is detected after the start of charging to automatically maintain the bypassing transistors for parallel monitors in conduction. It is also possible to place switching means in parallel with capacitors apart from the parallel monitors, the switching means being capable of shorting out these capacitors. Obviously, the switching means are not limited to semiconductor control devices. Mechanical switches having contacts may also be utilized.

Figure 5:
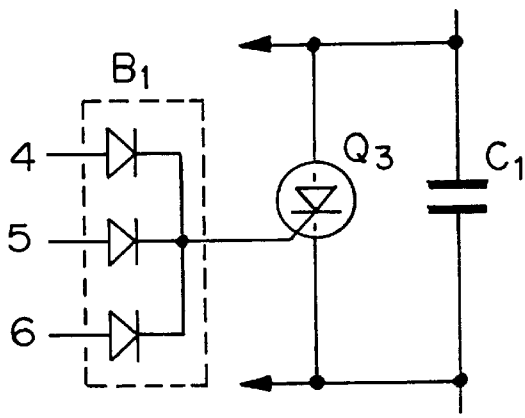
FIG. 5 is a circuit diagram of a still other power supply in accordance with the invention, and in which an electronic shorting means is mounted apart from parallel monitor-bypassing means.
Figure 6:
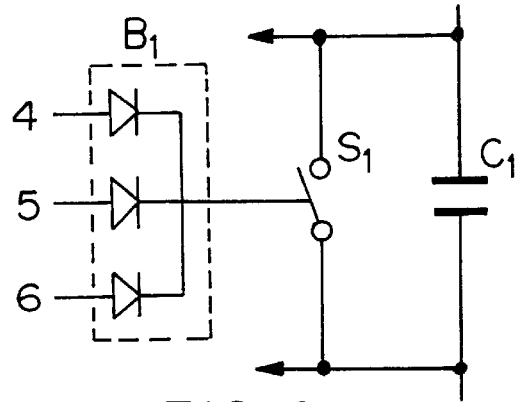
FIG. 6 is a circuit diagram of a yet another power supply in accordance with the invention, and in which devices having mechanical contacts are used as capacitor-shorting means.

FIGS. 5 and 6 show examples of mounting the means for shorting out capacitors, apart from the means for bypassing parallel monitors. In FIGS. 5 and 6, parallel monitor circuits (not shown) are connected in parallel with a capacitor $C_1$, apart from parallel monitor-bypassing means.

In FIG. 5, a shorting means $Q_3$ is a thyristor. If a signal indicating abnormality is fed from any one of terminals 4, 5, and 6 through an OR gate $B_1$ to the gate of the thyristor, this thyristor is turned on, shorting out the capacitor. Once turned on, the thyristor is kept on until the current flow ceases. Hence, the circuitry for providing control and maintaining the present state is simplified. If the state of each charged capacitor is detected and charging abnormality-indicating signals are supplied to the input terminals 4, 5, and 6, respectively, by the three methods described above, and if any capacitor at fault can be shorted out by any abnormality-indicating signal, the safety can be enhanced.

FIG. 6 shows an example of using a device $S_1$ having a mechanical contact, such as a switch or relay to short out a capacitor C1. The device $S_1$ is turned on by an abnormality-indicating signal passed through an OR gate $B_1$. In this case, it is necessary to hold the device $S_1$ in ON state and so a self-holding type relay or latching reed relay that needs limited holding current is used.

Preferably, the means for shorting out any capacitors at fault are kept ON if charging is complete and the temperature drops after the shorting means are once turned ON. Such characteristics can be quite easily realized where mechanical switches are used. Where semiconductor control devices are used, these characteristics can be accomplished by setting the hysteresis loop of the ON operation wide or making other contrivances.

In the novel power supply for storing electrical energy in capacitors, if any one of the capacitors connected in series is at fault, these defective capacitors are shorted out. Therefore, the capacitors not at fault can take over the charging and discharging operation without change. As the defective capacitors are shorted out in this way, the output voltage from the capacitor block may decrease, but this decrease can be circumvented by designing the power supply to the following tolerances.

It is assumed that plural capacitors, each having a rated voltage of 3 V, are connected in series to produce an output voltage of 3,000 V. For example, 1020 capacitors are connected in series to form a capacitor block. The power supply is started to be operated with a charging voltage slightly less than 3 V for each capacitor. As time passes, defective capacitors occur. These defective capacitors are successively shorted out. Correspondingly, the charging voltage for each capacitor is successively increased. In this way, the output voltage from the capacitor block can be always maintained at 3,000 V. When 20 capacitors are at fault and shorted out, each capacitor is charged to the rated voltage of 3 V. This is the maximum number of defective capacitors allowable.

In the above-mentioned embodiments, it is preferable to connect a current limiting resistor in series to shorting means for protecting the shorting means from destruction caused by a large shorting current.

As described in detail thus far, the present invention makes it possible to short out defective capacitors. Therefore, the power supply can be operated for a long time without repair or exchange. Especially, where the invention is applied to a large-scale electric power storage system, the reliability can be enhanced effectively. Furthermore, the maintenance can be effectively facilitated.

Having thus described my invention with the detail and particularity required by the Patent Laws, what is desired protected by Letters Patent is set forth in the following claims.

What is claimed is:

1. A power supply for storing electrical energy in a plurality of capacitors connected in series, said power supply comprising:

bypass means having a control input connected in parallel with each of said capacitors;

detection means for sensing defective capacitors from voltages developed across terminals of said capacitors during charging and applying a signal to said control input; and wherein if one of said capacitors is judged during charging to be defective by said detection means, said bypass means provides a low impedance bypass of the terminals of the capacitor judged to be defective.

2. The power supply of claim 1, wherein said bypass means is kept ON after once turned ON.

3. The power supply of claim 1 or 2, wherein said detection means senses defective capacitors by detecting that the terminal voltage rises at a higher rate than the terminal voltage of normal capacitors.

4. The power supply of claim 1 or 2, wherein said detection means senses defective capacitors by detecting that the time elapsed until a given terminal voltage is reached from the start of charging is shorter than a threshold value.

5. The power supply of claim 1 or 2, wherein said detection means includes means for receiving a charge start signal and in response thereto detecting the terminal voltages of the capacitors and comparison means for comparing the detected terminal voltages with a threshold value.

6. The power supply of claim 1 or 2, further comprising parallel monitors connected in parallel with said capacitors, respectively, said parallel monitors consisting of bypass means for bypassing charging currents of said capacitors and control means, which, when the voltage developed across the terminals of any one of said capacitors agrees with a reference value, controls said bypass means and bypasses the charging current supplied to said capacitor.

7. A power supply for storing electrical energy in a plurality of capacitors connected in series, said power supply comprising:

parallel monitors connected in parallel with said capacitors, respectively, said parallel monitors consisting of bypass means for bypassing charging currents of said capacitors and control means, which, when the voltage developed across the terminals of any one of said capacitors agrees with a reference value, controls said bypass means and bypasses a charging current supplied to the said capacitor;

shorting means connected in parallel with said capacitors, respectively;

detection means for sensing defective capacitors from temperatures of said bypass means of said parallel monitors during charging; and wherein if any one of said capacitors is judged during charging to be defective by said detection means, said shorting means shorts out terminals of the capacitor judged to be defective.

8. The power supply of claim 7, wherein said shorting means are kept ON after once turned ON.

9. The power supply of claim 7 or 8, wherein said bypass means of said parallel monitors also serve as said shorting means.

10. The power supply of claim 7 or 8, wherein said detection means detect defective capacitors from rises in temperature of said bypass means of said parallel monitors during a short time from the start of charging.

11. The power supply of claim 7 or 8, wherein said detection means detect defective capacitors from rises in temperature of said bypass means of said parallel monitors exceeding a threshold value.

* * * * *